US009764966B2

United States Patent
Van Der Heijden et al.

(10) Patent No.: US 9,764,966 B2
(45) Date of Patent: Sep. 19, 2017

(54) HYDROGEN SULFIDE REMOVAL FROM ANAEROBIC TREATMENT

(71) Applicant: Paques I.P. B.V., Balk (NL)

(72) Inventors: Petrus Cornelis Van Der Heijden, Heerenveen (NL); Jan Willem Albertus Bruins, Koudum (NL); Jacco Huisman, Joure (NL); Erik Van Zessen, Heerenveen (NL)

(73) Assignee: Paques I.P. B.V., Balk (NL)

( * ) Notice: Subject to any disclaimer, the term of this patent is extended or adjusted under 35 U.S.C. 154(b) by 272 days.

(21) Appl. No.: 14/655,045

(22) PCT Filed: Dec. 20, 2013

(86) PCT No.: PCT/NL2013/050937
§ 371 (c)(1),
(2) Date: Jun. 23, 2015

(87) PCT Pub. No.: WO2014/104877
PCT Pub. Date: Jul. 3, 2014

(65) Prior Publication Data
US 2015/0344326 A1      Dec. 3, 2015

(30) Foreign Application Priority Data

Dec. 24, 2012    (EP) .................................. 12199340

(51) Int. Cl.
*B01D 19/00*    (2006.01)
*C02F 1/20*    (2006.01)
(Continued)

(52) U.S. Cl.
CPC ............ *C02F 1/20* (2013.01); *B01D 19/0005* (2013.01); *B01D 19/0063* (2013.01); *C02F 3/28* (2013.01);
(Continued)

(58) Field of Classification Search
CPC ........................... B01D 19/00; B01D 19/0005
(Continued)

(56) References Cited

U.S. PATENT DOCUMENTS 5,490,933 A * 2/1996 LaPack ..................... C02F 1/20
                                                                210/603
6,656,249 B1    12/2003 Buisman et al.

FOREIGN PATENT DOCUMENTS

EP        0 331 806          9/1989
EP        0 487 705 B1       6/1992
(Continued)

OTHER PUBLICATIONS

International Preliminary Report on Patentability in PCT/NL2013/050937 dated May 22, 2015.
(Continued)

*Primary Examiner* — Robert A Hopkins
(74) *Attorney, Agent, or Firm* — Gilberto M. Villacorta; Sunit Talapatra; Foley & Lardner LLP

(57) ABSTRACT

Hydrogen sulfide can be removed from a liquid effluent of an anaerobic reactor, by subsequently: —contacting the effluent liquid in counter current with a treated product gas of the anaerobic reactor to absorb hydrogen sulfide in the gas, —collecting the desulfurized effluent liquid after said contacting, —discharging at least part of the collected desulfurized effluent recirculation liquid as a treated effluent. To a remaining part of the desulfurized effluent waste water can be added and mixed, and the mixed water can be fed to the anaerobic reactor. Spent gas of the contacting step can be combined with sulfide-containing product gas of the anaerobic reactor and treated by desulfurization.

22 Claims, 1 Drawing Sheet

(51) Int. Cl.
*C02F 3/28* (2006.01)
*C02F 101/10* (2006.01)

(52) U.S. Cl.
CPC ...... *C02F 3/2846* (2013.01); *C02F 2101/101* (2013.01)

(58) Field of Classification Search
USPC .............. 95/241, 263; 96/155, 202; 210/638
See application file for complete search history.

(56) References Cited

FOREIGN PATENT DOCUMENTS

| | | |
|---|---|---|
| EP | 0 561 889 B1 | 9/1993 |
| EP | 2 319 805 A1 | 5/2011 |
| FR | 2484990 A2 | 12/1981 |
| JP | 2005-262182 A | 9/2005 |
| JP | 2012-179571 A | 9/2012 |
| WO | WO-96/00191 A1 | 1/1996 |
| WO | WO-98/00191 | 1/1998 |
| WO | WO-2004/080573 A1 | 9/2004 |

OTHER PUBLICATIONS

International Search Report of PCT/NL2013/050937 mailed Aug. 12, 2014.

\* cited by examiner

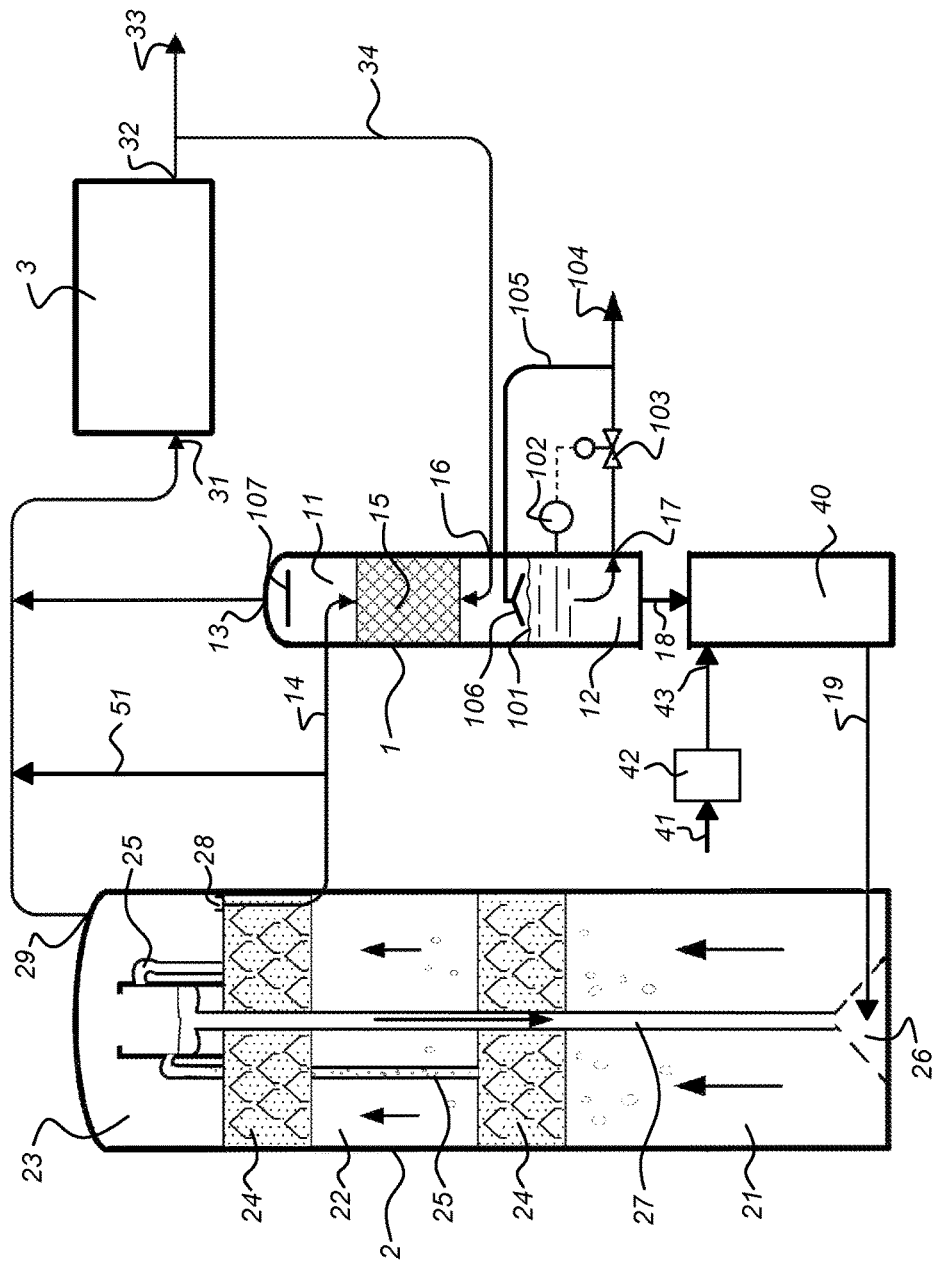

HYDROGEN SULFIDE REMOVAL FROM ANAEROBIC TREATMENT

CROSS REFERENCE TO RELATED APPLICATIONS

The present application is a National Stage of International Application No. PCT/NL2013/050937 filed on Dec. 20, 2013, which was published on Jul. 3, 2014, as WO 2014/104877 A2, and which claims the benefit of EP Application No. 12199340.6 filed Dec. 24, 2012, the entire disclosures of which are incorporated herein by reference.

The invention pertains to anaerobic waste treatment and in particular to the removal of hydrogen sulfide from anaerobic effluent.

BACKGROUND

Anaerobic treatment is a known process for producing biogas and other valuable organic compounds from waste water. However, waste water often contains sulfate ($SO_4^{2-}$) or other sulfur compounds, which, under the anaerobic conditions, are biologically converted to sulfide (mostly as HS). High concentrations of sulfide are toxic for the anaerobic biomass; they inhibit the methane formation and thus hamper the anaerobic treatment. Sulfide levels leading to 50% inhibition are 250 mg S/l in the pH range 6.4-7.2 and 90 mgS/l at pH at 7.8-8.0 (Koster et al. *Water Res.* 20 (12), 11561-67, 1986).

Thus, when treating waste water containing high concentrations of sulfate, it is important to control the sulfide level in the bioreactor to prevent inhibition. Waste waters containing high sulfate concentrations can be found for example in the fermentation industry (e.g. yeast and ethanol production), paper industry and starch processing industry.

In addition to inhibiting the anaerobic conversion process, sulfide resulting from sulfate and other sulfur compounds in the waste water partly ends up as hydrogen sulfide ($H_2S$) in the product gas of the anaerobic process, i.e. the biogas, and has a negative effect on the biogas quality and on the pollution reduction efficiency. Technologies are available for downstream removing the $H_2S$ from biogas in order to make the biogas available for further processing. Some of these technologies pollute the biogas with predominantly nitrogen and some oxygen or require an excessive amount of caustic or other chemicals. In contrast, THIOPAQ® technology as described e.g. in EP 0487705, EP 0561889, and U.S. Pat. No. 6,656,249 is an environmentally friendly method for removing $H_2S$ from biogas without polluting the biogas and without excessive caustic consumption, wherein the $H_2S$ is scrubbed from the biogas and is biologically oxidised to elemental sulfur.

EP 0331806 suggests to wash $H_2S$ from the biogas and convert it by chemical or biochemical means, and to recycle part of the washed biogas to the anaerobic reactor in order to assist the mixing of the anaerobic reactor content.

WO 98/00191 discloses an anaerobic sulfur removal process, wherein the sulfide-containing effluent of the anaerobic process is circulated to a stripper column wherein the sulfide is stripped from the effluent using a desulfurised gas (biogas) originating from the anaerobic reactor. The gas is desulfurised by oxidation to elemental sulfur using iron salts. FR 2484990 discloses a similar system using an unspecified desulfurisation device.

However, the prior art does not consider the use of a column for improving the performance of the anaerobic process. The prior art processes do not provide for accommodating fluctuations of pH and toxic components in the influent of the anaerobic reactor, and do not allow high hydraulic flows because of insufficient mixing in the anaerobic reactor and hence they cannot be optimally operated.

Therefore, it is an object of the present invention to provide a process and an equipment for anaerobic treatment of waste waters containing appreciable levels of sulfate or other sulfur compounds with improved treatment efficiencies and minimised sulfur contamination levels in the ultimate gaseous and liquid effluents.

SUMMARY OF THE INVENTION

It was found according to the invention that desulfurisation of effluent of an anaerobic reactor can be improved by stripping the effluent with a clean gas, in particular a cleaned biogas produced by the anaerobic reactor, using a stripper unit, which advantageously is a single vertical column which can further provide for degassing of the stripped effluent. Returning stripped effluent from the stripper column to the anaerobic reactor simultaneously allows for enhanced anaerobic conversion and for adjustment and detoxification of waste influent especially after mixing with influent of the anaerobic reactor.

DETAILED DESCRIPTION OF THE INVENTION

The invention pertains to a process of removing hydrogen sulfide from an effluent, in particular a recirculation liquid of an anaerobic reactor, as well as to a stripper column for removing the hydrogen sulfide from the effluent and for controlling the hydraulics of the anaerobic reactor system. The invention also pertains to a combination of such a stripper column with an anaerobic reactor and/or with a gas desulfurisation unit. Wherever reference is made herein to sulfide or hydrogen sulfide, these are understood to be interchangeable, depending on whether they are in liquid phase or in the gas phase. In the liquid phase, hydrogen sulfide ($H_2S$) is in equilibrium with hydrosulfide ($HS^-$) and sulfide stricto sensu ($S^{2-}$) and other species, depending inter alia on concentrations and pH.

The stripper unit according to the invention is an essentially vertical column (1) having a height which is at least twice, preferably at least three times its diameter, and in particular a height which is between 3.5 and 10 times its diameter. Depending on the capacity, the diameter can e.g. be between 0.5 and 15 meter, in particular between 2 and 6 m. The corresponding height can be e.g. between 5 and 50 m, in particular between 10 and 30 m. The column comprises an upper part (11) arranged for containing gas, and a lower part (12) arranged for containing liquid. From top to bottom, the column comprises:

a. a gas outlet (13) at the top for discharging spent (sulfide-loaded) cleaning gas, in particular treated product gas of the anaerobic reactor;
b. a liquid inlet (14), for introducing (sulfide-loaded) effluent from an anaerobic reactor (2), the inlet being provided with means for distributing the liquid into the gas zone, e.g. by spraying;
c. a contact zone (15) for intimately contacting gas and liquid, for example a packed bed;
d. a gas inlet (16), for introducing cleaning gas; and
e. a liquid outlet (17), for discharging treated effluent.

The stripper column can advantageously comprise, in the same column, a mixing tank as a bottom part (40), comprising:

f. a liquid inlet (43) for introducing raw waste water to be (anaerobically) treated;

g. a liquid outlet (19) at the bottom, for returning mixed effluent and waste water to the anaerobic reactor.

Alternatively, the mixing tank (40) may be a separate tank, which is connected with the stripper column (1) by a liquid line (18). An additional pre-conditioning tank (42) may be provided for flow buffering, control of nutrients, temperature, pH etc. and for pre-acidification of the waste water. This conditioning tank (42) can be a separate tank [with inlet (41)] or can be integrated and be the same as the mixing tank (40). In operations where only desulfurisation of the anaerobic reactor effluent is required, the mixing tank (40) and its connection with the stripper can be dispensed with, and the waste water influent for the anaerobic reactor will be fed through a pump sump, a single preconditioning and/or a mixing tank.

As used herein, the term "desulfurised" refers to a lowering of the sulfur content in any sulfur form, especially a lowered sulfide content, whether in neutral (molecular) or charged (anionic) form, and whether in gaseous or liquid or other form. The lowering is especially at least a factor 5, preferably at least a factor 10, more preferably a factor between 10 and 30, particularly a factor between 10 and 20.

For the anaerobic treatment according to the invention many different configurations exist, e.g. CSTR (Continuous Stirred Tank Reactor), CSTR reactors with sludge retention, UASB (Upflow Anaerobic Sludge Bed), hybrid reactors, anaerobic filters and more advanced reactors like IC (Internal Circulation) and EGSB (Expanded Granular Sludge Bed). For all these reactor types it is important that the biocatalyst (biological sludge') is in good contact with the waste water in order to get the highest biological activity. A commonly used method to obtain these optimal hydraulic conditions is by external recirculation of anaerobic effluent towards the influent distribution system of the anaerobic reactor. This leads to an increase in upflow velocity in the reactor and in improved mixing. Furthermore, the influent will be diluted by anaerobic effluent, and possible inhibitory effects or extreme conditions (pH, temperature, conductivity) can be avoided. Especially in high rate anaerobic reactors like the IC, EGSB or adapted configurations, the external recirculation flow device is a useful component of the anaerobic installation.

This external recirculation can be applied in different forms like with a pipe, via a recirculation tank or in other ways as known in the art. This external recirculation device can also be combined with the inlet of the waste water, and the outlet of the treated effluent. Features of the external recirculation are: a degassing zone to separate off gas from the anaerobic effluent, a proper mixing between the anaerobic effluent and the influent, and optional means for dosing chemicals and nutrients to obtain the optimal anaerobic conditions.

External recirculation can both be open to the atmosphere or under biogas conditions. Advantage of external recirculation under the atmospheric conditions is the possibility to strip $CO_2$, and therefore decreasing the caustic consumption, which is sometimes required during anaerobic treatment. External recirculation under biogas conditions is preferential in conditions where acid dosing is required. Furthermore the potential release of odorous components like $H_2S$ to the atmosphere is significantly lower in an external recirculation under a biogas conditions.

The biomass (bacterial sludge) to be used in the anaerobic reactor can be derived from any existing anaerobic reactor. The sludge may advantageously be in granular form for allowing high throughput. Such high rate anaerobic treatment corresponds to e.g. more than 10 kg COD per $m^3$ of reactor capacity per day.

DESCRIPTION OF THE FIGURE

The accompanying FIGURE depicts a stripper column (1) according to the invention, as well as a combination with an anaerobic reactor (2) and a desulfurising unit (3). The reference numerals are explained herein above and below. The stripper column is depicted in the FIGURE with a separate mixing tank (40), but the two may form a single continuous column, thus without a connection line (18), which constitutes a preferred embodiment of the invention.

In the stripper column (1), the upper part (11), which constitutes the gas zone including the contact zone (15) and which is delimited by the liquid surface (101), extends to between 20 and 50% of the height of the column from the top, in particular between 30 and 45% of the upper height of the column, including the mixing tank or mixing section (40). If, for example, the height of the total column is 20 m, the upper zone may be e.g. between 5 and 10 m. The vertical distance between the top of the lower part (12) of the column, i.e. the liquid surface level (101), and the liquid outlet (17) may be between 5 and 25%, preferably between 10 and 20% of the height of the reactor, i.e. about 2-4 m for a 20 m high column. This part corresponds to a degassing (gas separation) zone of the liquid part. The degassing can be optimised by adapting the diameter/height ratio, resulting in lower turbulence in the column and hence improved degassing. Where reference is made to "degassing", this includes both physical degassing, i.e. allowing dispersed gas bubbles to escape the liquid, and chemical degassing, i.e. allowing dissolved gaseous compounds such as oxygen, carbon dioxide, hydrogen sulfide, or the like, to evaporate, e.g. by temperature or pH (acidification) effects.

Likewise, the vertical distance between the liquid outlet (17) and the liquid inlet (18), in case of a single column, i.e. with integrated mixing section (40), should be sufficient to prevent influent waste water entering through (43) from directly leaving the column through (17). Thus the minimum distance is 4% of the height, and preferred heights are e.g. 5-20% or preferably 6-15% of the height. A separator, such as a perforated plate, baffle or propulsion means, may be provided between the liquid exit (17) and liquid inlet (43), in order to separate the degassing zone (upper part of liquid zone (12)) from the mixing zone (40) or to control the downward flow. In case of a separate mixing tank (40), such separation means can be dispensed with.

Also, the vertical distance between the liquid inlet (43) and the liquid outlet (19) in the mixing section or mixing tank (40) should be sufficient to allow effective mixing and dilution of the raw waste water before leaving the mixing zone and entering the anaerobic reactor. Preferably, the minimum vertical distance between (43) and (19) is at least 5%, preferably between 10 and 40% of the height of the total column (i.e. stripper plus mixing section).

The stripper column may advantageously be further provided with control devices for controlling the liquid inward and outward flows. In particular, a control device (102) may be provided which controls the flow through liquid outlet (17) through valve (103) as effluent (104) so as to adjust the liquid level (101) in the column.

In order to prevent foaming and hence insufficient separation of gas and liquid in or below the contact zone (15), a foam-inhibiting liquid can be sprayed onto the contact zone, which can be advantageously a part of the cleaned effluent (104). It can be introduced through line (105) and sprayer (106). Thus, in a particular embodiment, a part of the treated liquid effluent is sprayed onto collected effluent after the contacting step of the process of the invention and/or the stripper column (1) is provided by a sprayer (106) below the contact zone (15) of the upper part (11) of the column. 1

The contact material of zone (15) may be intermittently cleaned by cleaning-in-place, e.g. by adding a cleaning liquid (not shown), in particular an organic acid, such as formic acid or acetic acid, onto the contact material. The, preferably organic, liquid is subsequently degraded by the biomass in the anaerobic reactor. An additional advantage of this acid addition is that it assists in degassing the liquid effluent. Thus, in a particular embodiment, a liquid or dissolved organic acid is intermittently added to the contacting means contacting the effluent of the anaerobic reactor with the treated product gas.

In a further embodiment, a device for preventing liquid from being dragged along with the sulfide-loaded gas exiting the stripper column at the top can be provided, such as a knock-out drum or a splash plate (107) at the top of the stripper. Thus, in a particular embodiment, the stripper column (1) is proved with a liquid-collecting means (107) between the gas outlet (13) and the contact zone (15).

The stripper column is preferably of a cylindrical shape. Apart from the inlets and outlets as described above, the column is preferably essentially closed.

The combined anaerobic reactor and stripper unit of the invention comprises an up-flow anaerobic reactor (2) and the stripper column (1) as described above. A liquid outlet (19) of the mixing tank (or mixing section of the stripper column) can be connected to a liquid inlet (26) at the bottom of the anaerobic reactor, and liquid inlet (14) of the stripper column is connected to a liquid outlet (28) at the top of the anaerobic reactor.

The anaerobic reactor can be a closed reactor, but it can also be open. It is preferably closed, resulting in the essential absence of air in the headspace of the reactor and hence in the effluent leaving the reactor through exit (28). If desired, further degassing of the effluent may be provided by a degassing exit (51) in the line between exit (28) and inlet (14). The height dimensions of the anaerobic reactor may be comparable to those of the stripper-recirculator, although the anaerobic reactor is preferably somewhat higher, so as to allow a simple passing of the liquid discharged from the reactor to the stripper-recirculator. Typical dimensions of the anaerobic reactor are e.g. a height of 15 m and a diameter of 3 m, with an hourly throughput in the order of 10-20 m$^3$/h for a relatively small reactor and a height of 30 m and a diameter of 15 m, with an hourly throughput in the order of 1000-1500 m$^3$/h, for a relatively large reactor. Obviously any intermediate dimensions, but also smaller, down to e.g. 10 m or even 6 m height, and larger, up to e.g. 40 or even 50 m height, dimensions are feasible as well. A reactor height above 20 m is preferred.

The anaerobic reactor can advantageously comprise two compartments, a lower, relatively turbulent reactor zone (21) and an upper, relatively quiet reactor zone (22), and a top (headspace) gas zone (23). Gas can be collected from the reactor zones by gas collector hoods (24) and fed to the gas zone (3) through lines (25), and separation of gas from liquid and biomass in the upper gas zone (23). The gas leaves the reactor though exit (29) and can be fed to a desulfurisation unit (3). The anaerobic reactor is preferably equipped with an internal downflow circulation pipe (27), as in an IC reactor, having a flow rate which preferably at least equals the net total flow through the anaerobic reactor. Thus the recycle ratio within the reactor is preferably at least 1, more preferably between 2 and 6.

While the anaerobic reactor (2) and the stripper column (1) are suitably arranged as separate columns, it is possible to integrate the recirculator into the anaerobic reactor, for example as an inner cylinder within the (cylindrical) reactor, or as a vertical division of a combined reactor/stripper/recirculator, e.g. each as a half-cylinder. In either such an arrangement, a separate downflow circulation pipe (27) can be provided inside or outside the reactor, or be dispensed with. Also the downer pipe of the reactor could be combined into a stripper/recirculator.

A particular advantage of the invention is that the hydraulics can be controlled in a simple and cost-effective way, including a free fall—i.e. energy-saving—passage of the anaerobic effluent to the stripper column and the further downflow operation, as a result of the lower height or the lower position on the stripper column (1).

The combined stripper and gas cleaning unit of the invention comprises the stripper column (1) as described above and a gas desulfurisation unit (3). The desulfurisation unit can be a unit as described e.g. in EP 0487705, EP 0561889, and U.S. Pat. No. 6,656,249. The gas outlet (13) of the recirculator is connected to an inlet (31) of the desulfurisation unit for removing hydrogen sulfide, and the gas inlet (16) is connected to a gas outlet of the desulfurisation unit. The desulfurisation unit can comprise a scrubbing unit for absorbing the hydrogen sulfide into a scrubbing liquid and optionally a sulfide-oxidising reactor for oxidising the hydrogen sulfide (both within unit (3), not shown individually). This may be a chemical reactor converting sulfide to sulfur, sulfate or other sulfur species of positive oxidation state. Preferably, however, the reactor is an aerobic reactor comprising sulfide-oxidising bacteria. The aerobic reactor is operated with oxygen limitation so as to convert sulfide to elemental sulfur. The elemental sulfur is separated off by settling and the cleaned gas leaves the desulfurisation unit, optionally via a gas buffer tank, through outlet (32) and can be partially recycled through (34) as a cleaning gas for the stripper column (1) though inlet (16), and partially be used as gaseous fuel (33) for heat or power production.

The invention also pertains to a combination of an anaerobic reactor (2), a stripping column (1), with or without mixing section (40), and a gas desulfurisation unit (3), gas lines being provided between the anaerobic reactor (exit 29), and stripper column (exit 13) on the one hand, and gas desulfurisation unit (inlet 31), and between gas desulfurisation unit (exit 32) and stripping column (inlet 16), and a liquid line being provided between anaerobic reactor (exit 28) and stripper column (inlet 14). The combination further comprises a clean gas exit (33) and a waste water inlet (43), the latter either through a separate preconditioning tank (42) or through the mixing section or mixing tank (40), or both. The further optional, preferred parts of the combination are as described above and below. Particularly preferred is an embodiment in which the mixing section (40) is the bottom zone of stripping column (1) and a liquid line from exit (19) to inlet (26) is provided.

The invention also encompasses combinations of more than one anaerobic reactor with one or more stripping columns and one or more desulfurisation units, wherein a second reactor, column or unit can be used for continuing operation while the first one is disconnected for maintenance or the like. For example, two anaerobic reactors may be coupled to a single stripping column with desulfurisation unit, or a single anaerobic reactor may be coupled to two stripper columns. In the latter lay-out, it may be sufficient that only one stripper column is provided with the lower mixing zone for introducing and mixing fresh waste water to be treated. Especially advantageous is a combination of two anaerobic reactors and two stripper column, with connecting lines between each pair of reactor and column, with one or two desulfurisation units, allowing full operation at any time while one reactor or one column is in repair, and allowable double capacity when there is need for high capacity.

The process for removing hydrogen sulfide from a sulfide-containing effluent of an anaerobic reactor according to the invention comprises:
- contacting the effluent in counter current with a cleaning gas to absorb hydrogen sulfide in the gas, thus producing a desulfurised effluent and a sulfide-loaded gas,
- collecting the desulfurised liquid effluent after said contacting,
- discharging at least part of the collected desulfurised liquid as a treated effluent, and
- adding the sulfide-loaded gas to the produced gas of the anaerobic reactor and desulfurising it to produce the treated product gas.

Preferably the process further comprises, in the alternative that only a part of the collected desulfurised liquid is discharged as treated effluent:
- adding waste water to the remaining desulfurised liquid downstream of said discharging, and mixing and
- feeding the mixed liquid thus obtained to the anaerobic reactor.

The process is preferably performed in a single downflow column having an upper part for contacting the recirculation liquid with the gas, and a lower part for collecting the recirculation liquid, i.e. a liquid sump, discharging part of it and adding waste water. Such stripper-recirculation column is described above in more detail. Between said collecting and said discharging, i.e. in the upper liquid part of the column, the liquid is allowed to degas.

In the preferred embodiment where only a part of the collected desulfurised liquid is discharged, another part of the desulfurised effluent is recirculated. The volume ratio between discharged part and recirculated part can be adapted to the quality of the waste water and the performance of the anaerobic reactor. It can vary e.g. between 5:95 and 95:5, in particular between 15:85 and 80:20, more in particular between 25:75 and 60:40.

The cleaning gas is in particular a treated product gas of the anaerobic reactor, i.e. desulfurised biogas. The product gas (biogas) of the anaerobic reactor will contain appreciable levels of hydrogen sulfide, generally above 0.5 vol. %, typically between 1 and 2 vol. %. Major components of the product gas can be methane and carbon dioxide, and minor amounts of other hydrocarbons, carbon monoxide, or nitrogen. The cleaning gas entering the stripper column, i.e. the product gas after the desulfurising treatment, has a reduced hydrogen sulfide level which is as low as feasible. Preferably, the $H_2S$ level of the treated gas is less than 0.2 vol. %, preferably less than 0.05 vol. %, most preferably less than 0.02 vol. % (less than 200 ppm). Major components of the treated gas are still methane and carbon dioxide. The cleaning gas (and the biogas) is low in oxygen, i.e. less than 1 vol. % of oxygen; in particular it contains essentially no oxygen, i.e. less than 10 ppm of oxygen.

It is preferred for maintaining optimum pH conditions in the reactor and recirculator, that the gas contains appreciable levels of carbon dioxide. Preferred levels of carbon dioxide are at least 5 vol. %, more preferably at least 10 vol. % or even at least 15 vol. %, up to 50 vol. %, or preferably up to 40 vol. %. The presence of carbon dioxide in the biogas allows for a favourable pH control in the anaerobic reactor and the stripper, thus avoiding the need for substantial amounts of pH controlling chemicals such as caustic (sodium hydroxide) or acids. The preferred pH of the anaerobic liquid and the recirculation liquid, simultaneously allowing optimum growth and activity of the anaerobic bacteria and effective removal of hydrogen sulfide from the recirculation liquid, is between 6.0 and 9.0, preferably below 8.5, most preferred between 6.5 and 8.0. The reaction temperature in the anaerobic reactor is preferably at least 20° C., more preferably at least 25° C., preferably up to 45° C., or preferably up to 40° C. or up to 39° C. or even up to 37° C.

In the particularly preferred embodiment where the cleaning gas is biogas originating from the anaerobic reactor, the gas has been desulfurised prior to being contacted with the recirculation liquid. Desulfurisation can be performed using methods known in the art, including absorbing the hydrogen sulfide in a scrubbing liquid and conversion of the absorbed sulfide by chemical or biological oxidation processes, in which hydrogen sulfide is oxidised to sulfur, sulfite, sulfate, thiosulfate or other species which are less noxious than hydrogen sulfide and/or which can be conveniently separated from the gas. Preferably, the hydrogen sulfide is removed by biological oxidation to elemental sulfur, which can be easily separated off. The carrier liquid used for the (biological) oxidation can thus be recycled as scrubbing liquid and aerobic reactor liquid.

After having been used as a contacting liquid and having absorbed most or all of the hydrogen sulfide from the recirculation liquid, the spent gas is preferentially recycled through a desulfurisation step described above.

The invention also pertains to a process for the treatment of wastewater containing at least 50 mg of sulfur compounds on elemental sulfur basis, preferably at least 100 mg, more preferably at least 300 mg, most preferably at least 400 mg of sulfur compounds, on an elemental sulfur basis, in an upflow anaerobic reactor, and subjecting the sulfide-containing liquid effluent issuing from the anaerobic reactor collected at the top of the anaerobic reactor to removal of sulfide by the process described above.

As described above, the anaerobic reactor is advantageously designed as a closed reactor, wherein substantially all of the liquid effluent discharged from the reactor is recirculated through the stripper column and desulfurised by contacting with the cleaning gas. Alternatively, the anaerobic reactor can be an open reactor. Also most or all of the gaseous effluent is desulfurised in a separate unit, preferably a biological sulfide oxidation reactor, as described above.

The waste water to be treated in the anaerobic reactor is in particular waste water which contains significant levels of sulfur compounds. Such waste waters can originate from the papermaking industry, e.g. Kraft pulp process waste, from certain mining and chemical industries, from the biological production of alcohols (biofuels) or from scrubbing sulfur dioxide from waste gases, e.g. from combustion of sulfur-containing fuels, and the like. The sulfur compounds may be any sulfur species, such as sulfate, sulfite, thiosulfate, sulfide, etc. Levels of sulfur compounds may vary widely e.g. between 0.05 and 20 g of the sulfur compounds (on elemental sulfur basis) per l, in particular between 0.1 and 10 g sulfur per l. On sulfate basis, the weight amounts are three times the amount on elemental sulfur basis because of the molar weight ratio $SO_4^{2-}/S^0$ of $96/32$. Thus at least 0.05 g (50 mg) of sulfur compounds per l on elemental sulfur basis corresponds to at least 150 mg of sulfate per l.

Where the sulfur level is above 400 mg/l, preferably already when it is above 300 mg/l, on elemental sulfur basis, the waste water will have to be preconditioned, e.g. by dilution, to a level below 400 mg/l especially below 300 mg/l, even more preferably below 200 mg/l, in order to prevent intoxication of the anaerobic biomass. This is advantageously accomplished by adding the waste water in the mixing zone of the stripper column or a separate mixing tank (40). Further conditioning of the waste water, such as nutrient supply, acidification pH control etc. may be accomplished in a mixing section and/or in a precondition tank (42), so as to make it acceptable for anaerobic treatment. As a result of the features of the process and the equipment according to the invention, the present invention is particularly suited for treating waste waters containing more than 300 mg (on elemental sulfur basis, i.e. more than 900 mg sulfate), in particular more than 400 mg sulfur compounds (i.e. more than 1.2 g sulfate), most in particular more than 667 mg sulfur compounds (i.e. more than 2 g sulfate) per liter, up to e.g. 10 g sulfur compounds per liter.

The waste water preferably also contains a carbon source (organic matter), typically in the form of COD (chemical oxygen demand) matter. Preferably the ratio of COD (in mg of oxygen) to sulfur (in mg of elemental sulfur) is at least 0.5, preferably at least 4.

Enhanced stripping of the dissolved sulfide by desulfurised biogas leads to a reduction of the potentially inhibiting sulfide concentration. Preconditions of an effective stripping unit are: a spraying part to achieve an effective distribution of the liquid, a contact zone to achieve optimal contact between gas and liquid (for example in a packed bed scrubber), and a sump where the treated liquid is collected and transported further by e.g. pumping.

While $H_2S$ stripping inside the anaerobic reactor has been contemplated in the art, it appears that sulfide stripping cannot be achieved in a bioreactor without disturbing the optimum biological conditions, especially not in high rate anaerobic reactors where the liquid and gas upflow velocities are bound to operational limits. Therefore, the stripping process of the anaerobic effluent is preferentially performed in a stripping section according to the invention, which may be an external column or an internal vertical section of the anaerobic reactor. This stripping section is combined with the external recirculation device as well as with a waste water premixing zone, in order to reduce the amount of equipment. This combination allows for the various advantages of the present invention.

The accompanying FIGURE schematically shows such a recirculation/stripping column, depicted as (1). Anaerobic effluent enters at the top of the unit (14) and is distributed to a contact area like a packed bed as known by persons skilled in the art. Desulfurised biogas is fed in the column (16) and a sulfide-rich biogas leaves the column (13) and is lead to the biogas treatment section (3) together with the biogas formed in the anaerobic bioreactor (2). The (partly) desulfurised effluent is degassed in the degassing zone (between (101) and (17)), and part (or all) of it leaves the column (17) for further post-treatment or is discharged. The remaining part of the desulfurised anaerobic effluent enters the mixing zone 40, where it is mixed with influent. This mixture is fed to the anaerobic bioreactor (2) by a pump (or type of a positive liquid displacement device known by people skilled in the art). The FIGURE further shows the further components of a complete process including anaerobic reactor (2), recirculation, stripping (1) and desulfurisation of the biogas (3). For this desulfurisation process it is important to prevent pollution of the biogas often taking place with desulfurisation technologies known by people skilled in the art. A good example is THIOPAQ® technology, now known in the art, in which the absorption section of the biogas is separated from the biological desulfurisation process, and saturated with $CO_2$, ensuring a comparable $CO_2$ content before and after the THIOPAQ scrubber.

The invention claimed is:

1. A process for removing hydrogen sulfide from a sulfide-containing liquid effluent of an anaerobic reactor treating wastewater containing at least 100 mg/l of sulfur compounds on elemental sulfur basis, comprising:
    (i) contacting, in a stripper column, at least a major part of the liquid effluent of the anaerobic reactor in counter current with treated product gas of the anaerobic reactor to absorb hydrogen sulfide in the product gas, producing a desulfurised effluent and a sulfide-loaded gas,
    (ii) collecting the desulfurised effluent after said contacting in the column,
    (iia) allowing the liquid effluent collected in step (ii) to degas in the column,
    (iii) discharging a part of the collected effluent degassed in step (iia) as a treated effluent,
    (iv) adding a non-discharged part of the collected effluent degassed in step (iia) to a mixing tank, which is part of the column or which is connected to the column by a liquid line, and mixing it with influent waste water,
    (v) feeding the mixed liquid thus obtained to the anaerobic reactor, and
    (vi) desulfurising the sulfide-loaded gas produced in step (i) to produce the treated product gas.

2. The process according to claim 1, in which the treated product gas, before said contacting in step (i), contains less than 0.2 vol. % of hydrogen sulfide.

3. The process according to claim 1, in which the treated gas, before said contacting in step (i), contains at least 5 vol. % of carbon dioxide.

4. The process according to claim 1, in which said desulfurisation of step (vi) is performed by biological oxidation of hydrogen sulfide to elemental sulfur.

5. The process according to claim 1, in which the pH of the liquid effluent is between 6.0 and 8.5.

6. The process according to claim 1, in which substantially all of the liquid effluent of the anaerobic reactor is subjected to said contacting with treated product gas in step (i).

7. The process according to claim 1, in which the sulfide-loaded gas produced in step (i) is added to the product gas of the anaerobic reactor and substantially the entire product gas is desulfurised.

8. The process according to claim 1, in which said waste water contains between 0.1 and 10 g of sulfur compounds (on elemental sulfur basis) per l.

9. The process according to claim 1, which is performed in a single downflow column having an upper part for contacting the effluent with the gas, and a lower part for collecting the effluent after said contacting, and for degassing and discharging at least a part of the collected effluent, and further having a lowest part for adding and mixing waste water and feeding it to the anaerobic reactor.

10. A process for the treatment of wastewater containing at least 100 mg of sulfur compounds on elemental sulfur basis, comprising treating the wastewater in an upflow anaerobic reactor having a closed headspace and subjecting the sulfide-containing liquid effluent of the anaerobic reactor collected at the top of the anaerobic reactor to the process according to claim 1.

11. The process according to claim 2, in which the treated product gas, before said contacting in step (i), contains less than 0.05 vol. % of hydrogen sulfide.

12. The process according to claim 3, in which the treated gas, before said contacting in step (i), contains between 10 and 50 vol. % of carbon dioxide.

13. The process according to claim 8, in which said waste water contains between 0.1 and 10 g of sulfate, sulfite and/or thiosulfate (on elemental sulfur basis) per l.

14. The process according to claim 8, in which said waste water contains more than 400 mg/l of sulfur compounds (on elemental sulfur basis) per l, and wherein the sulfur concentration is reduced by dilution to below 400 mg/l before being fed to the anaerobic reactor.

15. The process according to claim 14, wherein the sulfur concentration is reduced by dilution to below 300 mg/l before being fed to the anaerobic reactor.

16. A downflow stripper column having a height which is at least twice its diameter, comprising an upper part arranged for containing gas and for contacting liquid with the gas, and a lower part arranged for containing liquid, the column comprising from top to bottom:
   a) a gas outlet at the top;
   b) a liquid inlet, comprising a means for distributing the liquid into gas, the liquid inlet being connected with a liquid outlet of an anaerobic reactor;
   c) a contact zone for intimately contacting gas and liquid;
   d) a gas inlet;
   e) a liquid outlet in said lower part, the zone of the lower part above said liquid outlet and below said gas inlet forming a degassing zone;
   f) a liquid inlet;
   g) a liquid outlet, which is connected to a liquid inlet of the anaerobic reactor;
   said inlet (f) and outlet (g) being provided in a mixing tank, which mixing tank is part of the column or which is connected to the column by a liquid line (18).

17. The stripper column according to claim 16, wherein said upper part extends to the upper 20 to 50% of the height of the column including said mixing tank, and/or the vertical distance between the top of the lower part and the liquid outlet, and the vertical distance between the liquid inlet and the liquid outlet each extending to at least 5%, preferably between 10 and 40% of the height of the column including said mixing tank.

18. A stripper and gas cleaning unit, comprising the stripper column according to claim 16, wherein the gas outlet is connected to an inlet of a sulfide-oxidising reactor for oxidising hydrogen sulfide, and the gas inlet is connected to a gas outlet of the sulfide-oxidising reactor, wherein the sulfide-oxidising reactor is an aerobic reactor comprising sulfide-oxidising bacteria, the aerobic reactor being operated with oxygen limitation to convert sulfide to elemental sulfur.

19. The stripper column according to claim 17, wherein a control device is provided for controlling the liquid level in the column by adjusting the flow through liquid outlet.

20. An anaerobic reactor and stripper unit, comprising an upflow anaerobic reactor and a downflow stripper column inside or outside the anaerobic reactor comprising a liquid inlet at the bottom, a liquid outlet at the top, and a gas outlet at the top of the anaerobic reactor, the stripper column comprising an upper part arranged for containing gas and for contacting liquid with the gas, and a lower part arranged for containing liquid and comprising from top to bottom:
   h) a gas outlet at the top, which is connected with the gas outlet of the anaerobic reactor to form a combined gas exit;
   i) a liquid inlet, comprising a means for distributing the liquid into gas, the liquid inlet being connected to the liquid outlet of the anaerobic reactor;
   j) a contact zone for intimately contacting gas and liquid;
   k) a gas inlet;
   l) a liquid outlet in said lower part, the zone of the lower part above said liquid outlet and below said gas inlet forming a degassing zone;
   m) a liquid inlet;
   n) a liquid outlet, which is connected to the liquid inlet of the anaerobic reactor;
   said inlet (f) and outlet (g) being provided in a mixing tank, which mixing tank is part of the column or which is connected to the column by a liquid line.

21. The anaerobic reactor and stripper unit according to claim 20, in which the anaerobic reactor is closed at the top.

22. The anaerobic reactor and stripper unit according to claim 20, in which the anaerobic reactor has a height of between 15 and 30 m, and/or the stripper column has a height of between 10 and 30 m, the height of the anaerobic reactor being at least the height of the stripper column.

* * * * *